US008510320B2

(12) United States Patent
Balko (10) Patent No.: US 8,510,320 B2
(45) Date of Patent: Aug. 13, 2013

(54) SILENT MIGRATION OF BUSINESS PROCESS BINARIES

(75) Inventor: Soeren Balko, Weinheim (DE)

(73) Assignee: SAP AG, Walldorf (DE)

( * ) Notice: Subject to any disclaimer, the term of this patent is extended or adjusted under 35 U.S.C. 154(b) by 54 days.

(21) Appl. No.: 13/206,960

(22) Filed: Aug. 10, 2011

(65) Prior Publication Data

US 2013/0041925 A1 Feb. 14, 2013

(51) Int. Cl.
*G06F 7/00* (2006.01)

(52) U.S. Cl.
USPC .......................................................... 707/758

(58) Field of Classification Search
USPC .......................................................... 707/758
See application file for complete search history.

(56) References Cited

U.S. PATENT DOCUMENTS

2004/0073913 A1* 4/2004 Fairweather ................... 719/328
2009/0158283 A1* 6/2009 Pinto et al. .................... 718/102

FOREIGN PATENT DOCUMENTS

| EP | 1 909 171 A1 | 4/2008 |
| EP | 1 975 787 A1 | 10/2008 |
| EP | 2 420 929 A1 | 2/2012 |
| WO | WO 02/079917 A2 | 10/2002 |

OTHER PUBLICATIONS

"XPath," Wikipedia, [online], <http://en.wikipedia.org/wiki/Xpath>, retrieved Aug. 9, 2011, 2 pages.
"XSLT", Wikipedia, [online], http://en.wikipedia.org/wiki/XLST>, retrieved Aug. 9, 2011, 11 pages.
"Regular Expression," [online], <http://en.wikipedia.org/wiki/Regular_expression>, retrieved Aug. 9, 2011, 16 pages.
"ECMAScript", Wikipedia, [online], <http://en.wikipedia.org/wiki/ECMAScript>, retrieved Aug. 9, 2011, 13 pages.
U.S. Appl. No. 12/848,679, filed Aug. 2, 2010, Balko et al.
U.S. Appl. No. 13/094,366, filed Apr. 26, 2011, Balko.
U.S. Appl. No. 13/102,837, filed May 6, 2011, Klinker et al.
Jie Meng et al, "DynaFlow: a dynamic inter-organisational workflow management system", International Jounral of Business Process Integration and Management Inderscience Enterprises Switzerland, vol. 1, No. 2, 2006, pp. 101-115, XP002684409.
Communication from EPO, Application No. 12004611.5-1243, mailed Oct. 23, 2012, re extended European Search Report, 10 pages.

* cited by examiner

*Primary Examiner* — Truong Vo
(74) *Attorney, Agent, or Firm* — Fish & Richardson P.C.

(57) ABSTRACT

The present disclosure describes methods, systems, and computer program products for migrating business process content. One method includes (i) identifying a rule set associated with at least one process binary, the at least one process binary comprising a compiled business process model for runtime execution, (ii) identifying at least one deployed process binary associated with the identified rule set; and (iii) modifying a portion of the at least one retrieved deployed process binary based on the identified rule set. In some implementations, the rule set may include at least one matching clause identifying a portion of a particular process binary for modification, as well as at least one transformation function for modifying the identified portion of the particular process binary. The at least one transformation clause can correspond to the at least one matching rule of the identified rule set.

10 Claims, 3 Drawing Sheets

SILENT MIGRATION OF BUSINESS PROCESS BINARIES

TECHNICAL FIELD

The present disclosure relates to software, computer systems, and computer implemented methods for migrating deployed business process content.

BACKGROUND

Business Process Management Suites (BPMS) generally rely on proprietary runtime formats tuned to automate and execute business processes. Both performance and resource consumption key performance indicators (KPIs) are associated with the choice of an appropriate runtime format. For example, SAP's NetWeaver BPMS employs "Trigger Networks" (TN), a RETE graph representing event-condition-action (ECA) rules. Process steps (e.g., BPMN entities such as activities, gateways, and events, etc.) can each be logically broken down into a group of ECA rules that are represented as a TN sub-graph. Each TN sub-graph may comprise mutually connected named operator nodes (of types, source nodes, target nodes, filter nodes, join nodes, projection nodes, etc.). Each node type may require a propriety configuration that is part of the TN. For instance, join nodes may be equipped with a join condition, filter nodes may have a filter predicate, target nodes may be bound to a transition script, and so on.

Apart from operator graphs, TNs comprise type definitions for status variables and configuration data for runtime components ("adapter configurations") that interact with the BPMS runtime. Status variables are plain records of named attributes. For example:

```
class Process {
    Process owner;
    Boolean suspended;
    long start_time;
    void terminateChildProcess( );
}
```

In the example above, the class "Process" comes with three attributes named "owner," "suspended," and "start_time." The attributes "suspended" and "start_time" have primitive types, whereas "owner" is a reference pointing to another "Process" instance. The class also provides for a method "terminateChildProcesses" which can be called by transition scripts and whose implementation is provided by the adapter that governs the type "Process." An adapter configuration is an XML document (i.e. a tree structure of nodes and values). An adapter provides connectivity of the BPMS runtime to some external component/application/system. For instance, the adapter that owns the "Process" type connects the BPMS runtime to a process administration and monitoring application.

A compiler component may be responsible for translating a BPMN-based process model (or any other BPM meta-model, such as BPEL, UML state charts, XPDL, etc.) into a TN comprising type definitions for status variables, operator graphs, and adapter configurations. The compiler component may exist at or may be used by a software developer or other third-party apart from the customer executing the TN at runtime. During a process' lifecycle, a reason for changing at least a portion of a TN may arise. Reasons may include BPMS release updates, bug fixes, performance optimizations, and operation modifications. Generally, changes made atop these TN process binaries incur significant costs, as a special-purpose migration controller may be necessary to perform the modifications or alter the operations of the process binaries. Additionally, risks associated with the modification may increase due to the fact that proprietary migration controllers acting upon complex binaries such as TNs are inherently complex. In particular, migration controllers must ensure that the resulting TNs remain syntactically and semantically correct after modifications are made. The migration controller must identify the TN building blocks that are to be altered, and then perform the corresponding change without affecting the operations of the rest of the TN.

SUMMARY

The present disclosure describes methods, systems, and computer program products for migrating business process content. One method includes (i) identifying a rule set associated with at least one process binary, the at least one process binary comprising a compiled business process model for runtime execution, (ii) identifying at least one deployed process binary associated with the identified rule set; and (iii) modifying a portion of the at least one retrieved deployed process binary based on the identified rule set. In some implementations, the rule set may include at least one matching clause identifying a portion of a particular process binary for modification, as well as at least one transformation function for modifying the identified portion of the particular process binary. The at least one transformation clause can correspond to the at least one matching rule of the identified rule set.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally relates to software, computer systems, and computer-implemented methods for silently migrating and updating business process content. Specifically, tools and methods are used to access deployed business process binaries, identify specific portions of the process binaries as defined by a matching rule (or clause), and modifying at least a portion of the identified portions of the process binaries by applying one or more transformation functions. In some instances, the combination of a particular matching rule and its associated transformation function(s) can be called a transformation rule. As described, the term "binary" may denote a runtime format suitable for process execution. It is not necessary that a "binary" be in a binary format, such that process binaries may also be in textual formats, such as an XML or a CSV file. The deployed business process binaries may be represented as any appropriate format, including SAP AG's trigger networks (TNs). The described methods and systems are highly versatile, and can be used to apply a wide variety of process binary migration use cases, including (1) functional extensions (i.e., to incorporate new/altered requirements), (2) corrections (i.e., bug fixes on deployed process content), (3) simplifications (i.e., to reduce the runtime footprint of a process, and (4) performance optimizations (i.e., to improve process KPIs), among others. Generally, migration scenarios apply to deployed process binaries residing in the business process management suites' (BPMS) runtime process repository. To minimize issues, the migration scenarios are generally easy to formulate without writing Java or other code. Specifically, the solution provides a lightweight, declarative scripting language that incorporates query languages (e.g., XPath, SQL, etc.), scripting languages (e.g., ECMAScript, JavaScript, VBScript, etc.), relational algebra, regular expressions, and custom scripting that can allow specific changes to be made within deployed process binaries without intrusive, complex, or expensive alterations.

The proposed solution addresses the issue by providing a declarative scripting language for silently migrating deployed process binaries (e.g., trigger networks). The scripting language allows matching clauses to be used to match status variable type declarations, configuration settings, conditional terms, and transition scripts based on regular expressions and XPath-like selectors. Migration instructions can be provided in a suitable scripting language, such as ECMAScript, with the instructions themselves being functions that act upon process binary entities bound to (i.e., satisfying) the corresponding matching clauses. In particular, matching clauses can be constructed to bind any suitable process binary fragment, including nested properties of top-level entities, such as types, operators, configuration keys, transition scripts, and others, to a variable that can be referenced from within a transformation function within the migration instructions. Transformation functions can apply to or be associated with an arbitrary combination of matching clauses, and can have access to both the global entities that are matched by one of the matching clauses (such as an operator graph, type, or configuration path) and/or the additional variables that are optionally bound to fragments or properties of those entities. Entities may further be represented as JavaScript (or other suitable) objects, giving access to the referenced entities through the properties of the corresponding objects. For example, a type gives access to an object's attributes which, in turn, give access to their name and type. Operators, on the other hand, give access to their nested and nesting operands.

Matching clauses may match entities through regular expressions, by stating variables that are bound by other matching clauses, and by logical Boolean expressions, as well as other suitable means. In this way, process binary entities can both be left underspecified (and thus potentially matching multiple entities) and be constrained to be equal to other entities. For instance, a type name might only be matched if it was suffixed with a version identifier that appears somewhere else in the process binary. Transformation functions can further alter process binary entities by adding, removing, or updating object properties. To do so, transformation functions can access a library of functions that can be used to construct a variety of process binary entities, such as operators, script statements, types, and others.

Transformation scripts and rule sets can be provided as part of standard lifecycle management procedures such as updates, upgrades, and/or fixes. The rule set can be provided by a software developer of the underlying business process in order to update the process binary deployed by a customer. The rule set can also be provided by the BPMS vendor, which applies the rule set to all process binaries of the customer. Once received, the rule sets can be interpreted by a dedicated scripted migration controller at the customer (or other location at which the process binary is to be updated) and used to apply the transformation scripts (including both the matching and transformation clauses) to the deployed process binaries. In general, the transformation scripts succeed to reduce risk and development costs of content migration through a number of advantages, including (1) being able to match and transform underspecified patterns of process binary entities and any properties thereof, (2) provide access to process binaries and their properties without needing to code a parser or renderer component, (3) relying on industry standards (i.e., regular expressions, XPath, etc.) to match process binary entities and fragments thereof, (4) using a non-typed and dynamically interpreted standard scripting language (i.e., ECMAScript) to manipulate process binary entities, and (5) representing process binary entities as JavaScript objects for each access and manipulation. That is, the process binary entities become directly accessible by means of the scripting language's programming model (i.e., no further transformation is required). Further, the total cost of ownership for customers and/or end users of developed software is almost zero, as changes are made by the BPMS vendor, and can be pushed or otherwise made available to the silent migration controller, such as when installing support packages provided by the BPMS vendor. The changes to the deployed process binaries which define the business processes can be made without customer intervention, and, in many cases, without the customer knowing the changes are being made. Still further, the developer is provided with means to update one or more process binaries through well-defined transformation scripts based on a well-defined syntax, such that no custom software need be developed to update process binaries. Instead, the changes to be made can be identified, with transformation scripts generated to target specific portions of the underlying process binary that can be used to make the specifically-identified changes.

Figure 1:
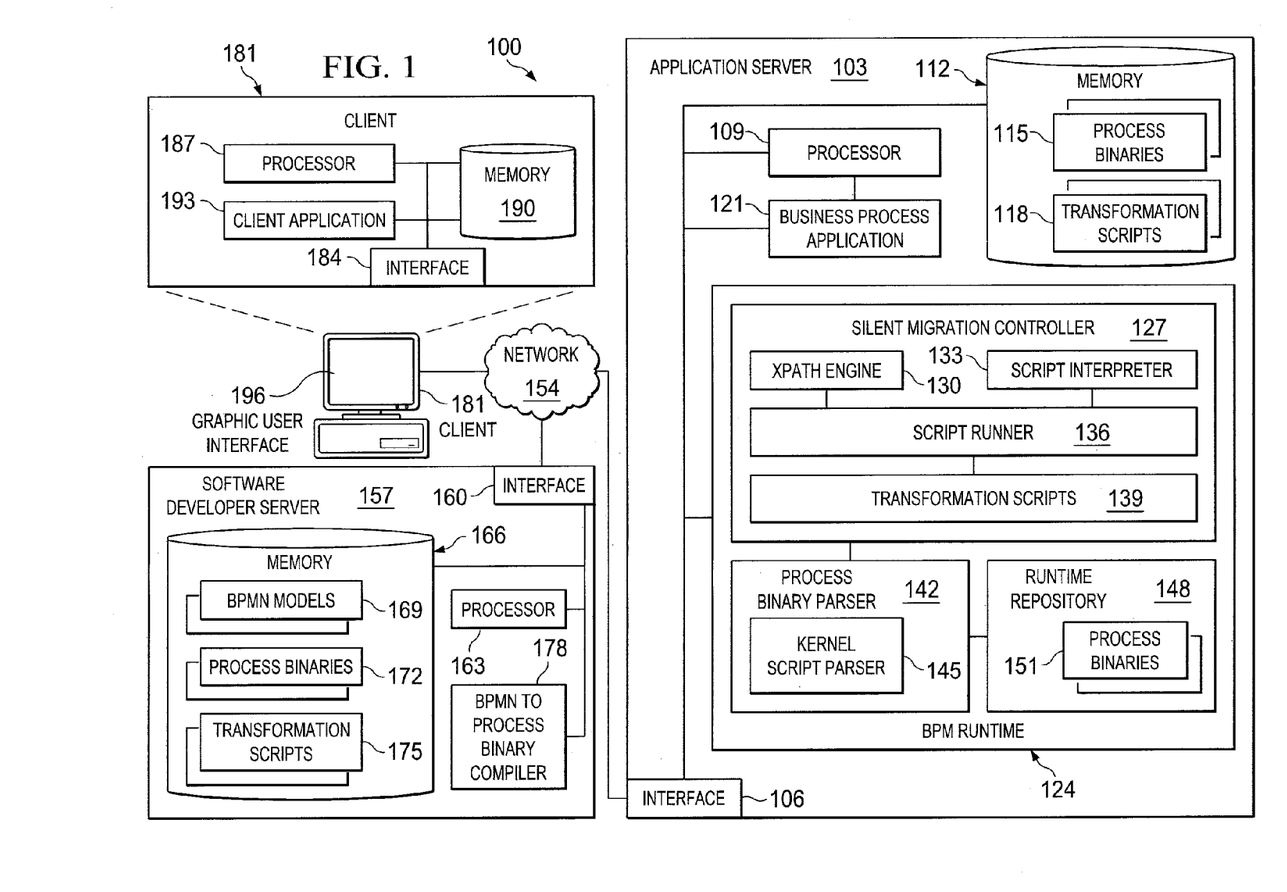
FIG. 1 illustrates an example environment for implementing various features of a system providing silent migration of and updates to business process binaries.

FIG. 1 illustrates an example environment 100 for implementing various features of a system providing silent migration of and updates to business process binaries. The illustrated environment 100 includes, or is communicably coupled with, an application server 103, a software developer server 157, and at least one client 181. At least some of the communication between the application server 103, the software developer server 157, and the client 181 may be performed across or via network 154. In general, environment 100 depicts an example configuration of a system for safely and silently migrating existing processes performed as part of an update to the BPMS system with regard to deployed business process binaries at one or more application servers 103, where the process binaries are updated using a generic, silent migration controller 127. The silent migration controller 127 can receive transformation scripts prepared by a BPMS vendor, the software developer, or other third party that define one or more changes to be made within a deployed process binary based on updates, modifications, and/or other changes to the underlying business process modeling notation (BPMN) model 169 on which the deployed process binary 151 is based. In some instances, the original developer of the processes that are migrated may not be the same person or entity that provides the transformation scripts. For deployed processes ("process binaries"), the underlying business process modeling notation (BPMN) model 169 may no longer be available outside of the deployed process binary 151, such that migrating the original process model is unavailable for performing an update or modification. Each client 181 may represent a business user or system interacting or working with one or more of the deployed process binaries 151 to execute and perform tasks associated with the underlying business process and business process application 121. The application server 103 executes at least a portion of the business process application 121 and its associated BPM runtime 124, where the BPM runtime 124 supports the execution of one or more deployed process binaries 151. The BPM runtime 124 can include the silent migration controller 127, which can be used to safely and silently (i.e., without user interactions) update particular process binaries 151 during their lifecycle. Environment 100 is an example, and in alternative implementations, the elements illustrated in FIG. 1 may be included in or associated with different and/or additional servers, clients, networks, and locations other than those as shown. For example, one or more of the components illustrated within the application server 103 may be located in multiple or different servers, cloud-based networks, or other locations accessible to the application server 103 (e.g., either directly or indirectly via network 154).

In general, the application server 103 is any server that stores and executes one or more business process applications 121. For example, each application server 103 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, each application server 103 may store a plurality of various other applications, while in other instances, each application server 103 may be a dedicated server meant to store and execute a particular business process application 121 and its related functionality. In some instances, the application server 103 may comprise a web server or be communicably coupled with a web server, where one or more of the business process applications 121 associated with the application server 103 represent web-based (or web-accessible) applications accessed and executed through requests and interactions received on the client 181, executing a client application 193 operable to interact with the programmed tasks or operations of the corresponding business process application 121.

At a high level, the application server 103 comprises an electronic computing device operable to receive, transmit, process, store, or manage data and information associated with the environment 100. The application server 103 illustrated in FIG. 1 can be responsible for receiving application requests from one or more clients 181 (as well as any other entity or system interacting with the application server 103, including desktop or mobile client systems), responding to the received requests by processing said requests in the associated business process application 121, and sending the appropriate responses from the business process application 121 back to the requesting client 181 or other requesting system. The business process application 121 can also process and respond to local requests from a user locally accessing the application server 103. Accordingly, in addition to requests from the clients 181 illustrated in FIG. 1, requests associated with a particular business process application 121 may also be sent from internal users, external or third-party customers, and other associated business applications or business processes, as well as any other appropriate entities, individuals, systems, or computers. In some instances, the business process application 121 may be a web-based application executing functionality associated with a networked or cloud-based business process.

As used in the present disclosure, the term "computer" is intended to encompass any suitable processing device. For example, although FIG. 1 illustrates a single application server 103, environment 100 can be implemented using any number of servers, as well as computers other than servers, including a server pool. Indeed, the application server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated application server 103 may be adapted to execute any operating system, including Linux, UNIX, Windows, Mac OS, or any other suitable operating system.

In the illustrated implementation of FIG. 1, the application server 103 includes an interface 106, a processor 109, a memory 112, a business process application 121, and a BPM runtime 124 (which may be a runtime portion of the business process application 121 in some implementations, and/or may act as an infrastructure supporting and managing the execution of the at least a part of the business process application 121). In some instances, the application server 103 and its illustrated components may be separated into multiple components executing at different servers and/or systems. Thus, while illustrated as a single component in the example environment 100 of FIG. 1, alternative implementations may illustrate the application server 103 as comprising multiple parts or portions accordingly.

FIG. 1 depicts a server-client environment, but could also represent a cloud computing network based on particular deployment options. Various other implementations of the illustrated environment 100 can be provided to allow for increased flexibility in the underlying system, including multiple application servers 103 performing or executing one or more additional or alternative instances of the business process application 121, as well as other applications associated with or related to the business process application 121, including those illustrated as included as part of the business process application 121 and/or BPM runtime 124. In those instances, the different application servers 103 may communicate with each other via a cloud-based network or through the connections provided by network 154.

The interface 106 is used by the application server 103 to communicate with other systems in a client-server or other distributed environment (including within environment 100) connected to the network 154 (e.g., one of the clients 181, as well as other systems communicably coupled to the network 154). The interface 106 generally comprises logic encoded in software and/or hardware in a suitable combination and operable to communicate with the network 154. More specifically, the interface 106 may comprise software supporting one or more communication protocols associated with communications such that the network 154 or the interface's hardware is operable to communicate physical signals within and outside of the illustrated environment 100.

Generally, the application server 103 may be communicably coupled with a network 154 that facilitates wireless or wireline communications between the components of the environment 100 (i.e., between the application server 103 and one or more clients 181 and/or the software developer server 157), as well as with any other local or remote computer, such as additional clients, servers, or other devices communicably coupled to network 154, including those not illustrated in FIG. 1. In the illustrated environment, the network 154 is depicted as a single network, but may be comprised of more than one network without departing from the scope of this disclosure, so long as at least a portion of the network 154 may facilitate communications between senders and recipients. In some instances, one or more of the components associated with the application server 103 may be included within the network 154 as one or more cloud-based services or operations.

The network 154 may be all or a portion of an enterprise or secured network, while in another instance, at least a portion of the network 154 may represent a connection to the Internet. In the illustrated example, at least a portion of the network 154 includes a portion of a cellular or mobile data network or other network capable of relaying short message service (SMS) or multimedia messaging service (MMS) messages, as well as other suitable mobile data messaging. In some instances, a portion of the network 154 may be a virtual private network (VPN). Further, all or a portion of the network 154 can comprise either a wireline or wireless link. Example wireless links may include 802.11a/b/g/n, 802.20, WiMax, 3G, 4G (i.e., LTE), and/or any other appropriate wireless link. In other words, the network 154 encompasses any internal or external network, networks, sub-network, or combination thereof operable to facilitate communications between various computing components inside and outside the illustrated environment 100. The network 154 may communicate, for example, Internet Protocol (IP) packets, Frame Relay frames, Asynchronous Transfer Mode (ATM) cells, voice, video, data, and other suitable information between network addresses. The network 154 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the application server 103 includes a processor 109. Although illustrated as a single processor 109 in the application server 103, two or more processors may be used in the application server 103 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the application server 103 and, specifically, the functionality associated with the corresponding business process application 121 and the BPM runtime 124. In one implementation, the server's processor 109 executes the functionality required to receive and respond to requests and instructions from the client 181 and/or the software developer server 157, as well as the functionality required to perform the operations of the associated business process application 121 and BPM runtime 124, among others.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, ABAP, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding business process application and BPM runtime 124 stored on the associated application server 103. In some instances, a particular application server 103 may be associated with the execution of two or more business process applications 121 (and other related components), as well as one or more distributed applications executing across two or more application servers 103.

At a high level, each business process application 121 is any application, program, module, process, or other software that may execute, change, delete, generate, or otherwise manage information associated with a particular application server 103, and in some cases, a business process performing and executing business process-related events. In particular, business processes communicate with other users, applications, systems, and components to send and receive events. In some instances, a particular business process application 121 may operate in response to and in connection with one or more requests received from an associated client 181 or other remote client. Additionally, a particular business process application 121 may operate in response to and in connection with one or more requests received from other business process applications 121, including a business application associated with another application server 103 (not illustrated). In some instances, each business process application 121 may represent a web-based application accessed and executed by remote clients 181 via the network 154 (e.g., through the Internet, or via one or more cloud-based services associated with the business process application 121). Further, while illustrated as internal to the application server 103, one or more processes associated with a particular business process application 121 may be stored, referenced, or executed remotely. For example, a portion of a particular business process application 121 may be a web service that is remotely called, while another portion of the business process application 121 may be an interface object or agent bundled for processing at a remote system (not illustrated) or client 181 (e.g., the client application 193). Moreover, any or all of a particular business process application 121 may be a child or sub-module of another software module or enterprise application (not illustrated) without departing from the scope of this disclosure. Still further, portions of the particular business process application 121 may be executed or accessed by a user working directly at the application server 103, as well as remotely at a client 181.

The business processes performed by the business process application 121 may include actions performed on or associated with one or more process binaries 115 stored in memory 112. Memory 112 of the application server 103 stores data and program instructions. Memory 112 may include any memory or database module and may take the form of volatile or non-volatile memory including, without limitation, magnetic media, optical media, random access memory (RAM), read-only memory (ROM), removable media, or any other suitable local or remote memory component. Memory 112 may store various objects or data, including classes, frameworks, applications, backup data, business objects, jobs, web pages, web page templates, database tables, process contexts, repositories storing services local to the application server 103, and any other appropriate information including any parameters, variables, algorithms, instructions, rules, constraints, or references thereto associated with the purposes of the application server 103, its business process application 121 and BPM runtime 124. In some implementations, including a cloud-based system, some or all of memory 112 may be stored remote from the application server 103, and communicably coupled to the application server 103. As illustrated, memory 112 includes the set of business process binaries 115 and one or more transformation scripts 118.

The business process binaries 115 represent compiled versions of one or more BPMN models 169 (illustrated within the software developer server 157). Generally, application servers 103 and their business process applications 121 do not execute BPMN models 169 themselves, but instead process binaries 115 (and 172) that are created after compiling the underlying, corresponding BPMN model 169. The business process application 121, using its related BPM runtime 124, can execute the one or more process binaries 115 (i.e., deployed process binaries 151) to perform the actions, events, and processes of the corresponding BPMN model 169. Process binaries typically differ from the underlying modeling language (e.g., BPMN), even though a BPMS runtime might also interpret the process model directly. Reasons for using a process binary format that differs from the process model are (1) performance, (2) reuse, and (3) extensibility. With regard to performance, typically process binaries are optimized to yield the best performance when executing a process, as opposed to merely interpreting a BPMN model. The same is true for other programming languages where the program binaries offer a better performance than interpreting the program source code directly. Reuse of the underlying runtime infrastructure where one and the same infrastructure (e.g., a Java VM and a JEE application server on top) may be used to execute a plethora of different application types, including business processes, user interfaces, business rules, Web services, etc. With regard to extensibility, a BPMS runtime may need to offer broader functionality than merely executing processes. That may include abilities to execute functionality that is often used in conjunction with business processes, such as business rules, complex event processing, status and action model tracking, business activity monitoring, and others. In practice, BPMS runtimes differ greatly in terms of the format of the process binaries. Some BPM offerings use another BPM standard, such as BPEL, as their binary format. Trigger networks are used which formally represent event-condition-action rules where the events are status variable changes, the conditions are first-order logic terms expressed as RETE graphs, and the actions are script snippets performing status variable updates and calls to external components and applications (such as a task management application).

Generally, the process binaries 115 (and 172) derived from a particular BPMN model 169 comprise complex, highly structured sets of information that are executable to perform the business processes defined within the underlying BPMN model 169. When a deployed process binary 151 is modified by the silent migration controller 127, the resulting modified process binary can be saved in memory 112 as an updated process binary 115, in some instances replacing the version stored prior to the modification.

The transformation scripts 118 represent scripts used by the silent migration controller 127 to update one or more of the deployed process binaries 151. The transformation scripts 118 can include a set of matching rules (or clauses) and a set of transformation functions that combine to define one or more transformation rules associated with the associated process binary 151. The transformation scripts may include a matching condition used to determine when the transformation rule is to be applied, and on which artifacts in the process binary. The matching rules can represent a type of search instruction in the transformation script 118 to identify certain portions of the corresponding process binary 151 that are affected by the transformation and that are to be modified. The transformation functions define one or more modifications to be made to the portions identified within the process binary 151 by the matching rules.

In order to provide consistent modifications and textual matching, the transformation scripts 118 may be associated with a scripting language that can be used by the silent migration controller 127 to perform the defined modifications and identify the correct matches. In some instances, the scripting language may be based, at least in part, on ECMAScript, although other scripting languages may also be used. The following illustrates an example implementation of a defined syntax used for the scripting language for some transformation scripts 118. The defined syntax of the example scripting language (written in Backus-Naur-Form) states:

```
RULE ::= "rule" IDENTIFIER "{" MATCHES
    TRANSFORMATIONS "}"
MATCHES ::= MATCH+
MATCH ::= "match" (TYPE-MATCH|CONFIG-MATCH|PATH-
    MATCH) "as" IDENTIFIER ";"
TYPE-MATCH ::= "class" CLASS (INCLUDES|EXCLUDES)+
REGEXP-MATCH ::= [IDENTIFIER "="]
    (IDENTIFIER|ECMASCRIPT:REGEXP)
CLASS ::= [IDENTIFIER "=" "("] REGEXP-MATCH ":"
    REGEXP-MATCH [")"]
INCLUDES ::= "includes" ["strictly"] ATTRIBUTES
    METHODS
EXCLUDES ::= "excludes" ATTRIBUTES METHODS
ATTRIBUTES ::= [ATTRIBUTE ("," ATTRIBUTE)*]
ATTRIBUTE ::= [IDENTIFIER "=" "("] TYPE REGEXP-
    MATCH [")"]
TYPE ::= (REGEXP-MATCH|CLASS)
METHODS ::= [METHOD ("," METHOD)*]
METHOD ::= [IDENTIFIER "=" "("] TYPE REGEXP-MATCH
    "(" [TYPE ("," TYPE)*] ")"[")"]
CONFIG-MATCH ::= "config" REGEXP-MATCH ("/"
    REGEXP-MATCH)* "=" REGEXP-MATCH
PATH-MATCH ::= "network" TERM
ACTION ::= "{" COMMAND* "}" "(" TERM ")"
COMMAND ::= [IDENTIFIER "=" "("] (WILDCARD |
    CREATION | UPDATE | ASSIGNMENT | DELETION |
    INVOCATION) [")"]
WILDCARD ::= "*"
CREATION ::= [REGEXP-MATCH "="] "new" CLASS "("
    [PARAMETERS] ")" ";"
UPDATE ::= [CLASS] REGEXP-MATCH ":" REGEXP-MATCH
    "=" REGEXP-MATCH ";"
ASSIGNMENT ::= REGEXP-MATCH "=" [CLASS] REGEXP-
    MATCH [":" REGEXP-MATCH] ";"
DELETION ::= "delete" [CLASS] REGEXP-MATCH ";"
INVOCATION ::= [REGEXP-MATCH "="] [CLASS] REGEXP-
    MATCH ":" REGEXP-MATCH "(" [PARAMETERS] ")"
    ";"
TERM ::= [IDENTIFIER "=" "("] (ACTION |
    PROJECTION | SELECTION | JOIN | INHIBITOR |
    BINDING | WILDCARD) [")"]
BINDING ::= "bind" IDENTIFIER "to" CLASS
PROJECTION ::= "project" PARAMETERS "from"
    "(" TERM ")"
SELECTION ::= "filter" REGEXP-MATCH TERM "by"
    PREDICATE
JOIN ::= "join" REGEXP-MATCH "(" TERM ")" "and"
    "(" TERM ")" "by" PREDICATE
INHIBITOR ::= "inhibit" REGEXP-MATCH "(" TERM ")"
    "from" "(" TERM ")" "by" PREDICATE
PARAMETERS ::= REGEXP-MATCH ("," REGEXP-MATCH)*
```

-continued

```
PREDICATE ::= [IDENTIFIER "=" "("] COMPARISON
    ("and" COMPARISON)* [")"]
COMPARISON ::= REGEXP-MATCH ("==", "!=", "<",
    ">", "<=", ">=") REGEXP-MATCH
TRANSFORMATIONS ::= TRANSFORMATION+
TRANSFORMATION ::= "transform" IDENTIFIER (","
    IDENTIFIER)* "with" FUNCTION
FUNCTION ::= ECMASCRIPT:FUNCTION
```

The defined syntax provides the semantics for which the transformation scripts 118 can define the modifications that are to be made to process binaries 151. For example, a matching rule looking for a particular type is preceded by the keyword "class" as shown above. A name or pattern that matches the name of the type is also provided, as illustrated by the uppercase "CLASS". Uppercase words that are not surrounded by quotes may denote so-called non-terminals, which can be rewritten using expansion rules of the syntax. Some matching rules can use regular expressions to identify particular clauses, terms, phrases, and other information to be located, although the matching rules may be associated with other types of searches, matching functions, or related operations as opposed to regular expressions. The transformation scripts 118 then provide one or more transformation functions based on the predefined syntax and scripting language to perform the defined operations. Transformations can apply to a list of matches that are available both as a reference to and a subject to a transformation itself.

The following is a first example transformation rule 118:

```
rule renameAttribute {
    match class /BPMNAdapter/ : /Process/\
        includes
            /BPMNAdapter/ : /Process/ ownerName=
/owner/,
        as processClassMatch;
        transform processClassMatch with
function(processClassMatch) {
            for (var i=0, ii=processClassMatch.length;
i<ii; i++) {
                processClassMatch[i].ownerName = "parent";
            }
        }
}
```

This transformation rule 118 defines a matching clause that fetches all type declarations in the process binary of class "Process" that are in the namespace of "BPMNAdapter." Further, the matching clause or rule requires an attribute named "owner" to exist which is bound to a variable "ownerName." The transformation rule applies to all matches found by the clause "processClassMatch." In fact, those matches become an array parameter of the transformation rule where the transformation rule is denoted by "transform." This transformation rule renames the attribute "owner" of the matched type declarations into "parent." Individual matches are available as elements of the "processClassMatch" array. Each array element is itself an object which gives access to the entities that were bound to a variable in the matching clause. In that case, we have bound the "owner" attribute to a variable "ownerName." In fact, almost any process binary element can be bound to a variable where plain entities are bound to attributes having simple types (such as Strings, Numbers, Booleans).

A second example can show how to bind more heavyweight entities, such as attributes, methods, and entire classes, among others. In one example, implementation, the to-be-bound entity should be put in brackets. For instance, the following example illustrates a transformation script 118 to remove the method declaration "terminateChildProcesses" from the "Process" type.

```
rule removeMethod {
    match class /BPMNAdapter/ : /Process/
        includes
            myMethod =( void
/terminateChildProcesses/ ( ) ),
        as processClassMatch;
        transform processClassMatch with
function(processClassMatch) {
            for (var i=0, ii=processClassMatch.length;
i<ii; i++) {
                delete processClassMatch[i].myMethod;
            }
        }
}
```

In this example, the entire method declaration of "terminateChildProcesses" is bound to the variable "myMethod." In this way, the entire method is removed from the class declaration. In contrast, solely binding the method name to a variable and deleting that variable from the processClassMatch array element would have left the class declaration in a corrupt state (i.e., the method declaration would lack a method name, while the return type and the parameter list would still be present).

In some cases, matching clauses and rules may be further underspecified. This may be due to (1) some parts of a to-be-transformed entity are not subject to transformation (i.e., some attributes of a type declaration may not need to be altered), (2) a rule shall generally apply to a whole pattern of similar entities, or (3) some parts of the process binary are unknown to the creator of a migration rule or transformation script 118. The latter is important for versioning information (MD5 fingerprints) that is incorporated into process binaries at various places, including type name suffixes, configuration path elements, and even operator predicates. The need to match those unknown entities may remain, but are left underspecified in the matching clause. To do so, symbolic names can be provided as regular expressions that (potentially) match a whole range of actual text literals. For instance, the following rule matches all "Process_suffix" classes having a typed "owner" reference attribute to another "Process_suffix" instance, where suffix denotes some arbitrary suffix to the class name:

```
rule addTokenClass {
    match processClass=(class /BPMNAdapter/ : /Process__.*/
        includes
            /BPMNAdapter/ : processClass.name /owner/ )
        as processClassMatch;
        transform processClassMatch with
function(processClassMatch) {
            for (var i=0, ii=processClassMatch.length; i<ii;
i++){
                var processName
=processClassMatch[i].processClass.name;
                var underscore = processName.indexOf("__");
                var suffix =
processName.substring(underscore+1);
                processClassMatch[i].tokenClass = new
    Type("BPMNAdapter","Token__"+suffix, {owner:
processClassMatch[i].processClass});
            }
```

The rule of the example transformation script entitled "addTokenClass" illustrated above adds another type named "Token_suffix" which shares the suffix with the "Process_suffix" class that was matched in the "processClass" variable which stores the entire class definition. The rule already makes use of the "processClass.name" variable when the "owner" attribute is a typed reference to another instance of "Process_suffix". Within the transformation, the rule can then access "processClass," both to define a typed "owner" attribute in the newly created "Token_suffix" class and to extract the suffix itself and amend the name of the Token class, accordingly.

Sometimes, an adapter configuration needs to be transformed. Adapters are "glue components," providing connectivity between the BPMS runtime and external applications and components, such as task management software. An adapter configuration bundle can be thought of as a tree structure where the root is the adapter, the inner nodes are some strings (typically, predefined property names or string literals that depend on some model data) and the leaf nodes are key-value-pairs. To match a "path" within that tree structure, a simple subset of XPath is provided which lets the user or developer specify the levels of the path to match. As with type matches, more than a single path may be returned, such that the corresponding transformation functions need to traverse an array of matching paths. Each path can be represented as a nesting of JavaScript objects, having a "properties" property (which gives access to the node's properties) and a "next" property which lets the rule drill down to the next element in the path. In addition, a "children" array property gives access to all child elements (including the ones that are not selected by the matching clause), while a "parent" property lets one navigate to the parent path element.

An example assumption is made that the following adapter configuration snippet could be a symbol table that assigns token status values (0, 1, . . . ) to the model keys (0xdeadbeef, 0xhotcoffe) of the BPMN artifacts in the design time model:
BPMNAdapter/Token__123/SYMBOLS/0=0xdeadbeef
BPMNAdapter/Token__123/SYMBOLS/1=0xhotcoffe.

Adapter configuration is often assigned to a specific type, in this case to a "Token_suffix" type where "suffix" is the process version (here: "123") that is also used for other type definitions (e.g., the "Process_suffix" type). The string "SYMBOLS" may be a fixed property name which introduces a node whose leafs are key-value-pairs that assign a token position to a model key. If the process binary had to be patched to provide for another token state, a transformation script could look as follows:

```
rule addTokenState {
    match class
        /BPMNAdapter/:(tokenClassName=/Token__.*/)
        as tokenClassMatch;
    match config
        /BPMNAdapter/ / tokenClassName / /SYMBOLS/
        as tokenSymbolsMatch;
    transform tokenClassMatch, tokenSymbolsMatch with
function(tokenClassMatch, tokenSymbolsMatch) {
        if (tokenSymbolsMatch.length==0) {
            tokenSymbolsMatch[0] = new Config(
["BPMNAdapter", tokenClassMatch[0].tokenClassName,
"SYMBOLS"]);
        }
        tokenSymbolsMatch[0].properties["2"] = "0x1badbabe";
    }
}
```

The rule formulates two matching clauses which are always processed in the order in which they appear in the rule. That is, the rule will initially try to match "tokenClassMatch" (on the entire process binary) before applying "tokenSymbolsMatch". The first matching clause ("tokenClassMatch") essentially matches the name of the "Token_suffix" type which is reused in the second clause ("tokenSymbolsMatch") to fetch the corresponding adapter configuration (which itself references the name of the "Token_suffix" type. The transformation function references both matching clauses which, correspondingly, become parameters of the transformation function. If the second matching clause failed to match any configuration (e.g., because that configuration did not exist in the original process binary), the "BPMNAdapter/Token_suffix/SYMBOLS" configuration path is initially created. This is where the first matching clause provides the name of the "Token_suffix" class. This rule silently assumes the first matching clause will succeed. Finally, another property of the "SYMBOLS" node is created, which is the "2"="0x1badbabe" key-value-pair.

In another example, an instruction (debugger instrumentation code) may be added to all transition scripts that change a token position. To do so, it is necessary to match all scripts which alter the "position" attribute of some instance of "Token_suffix" attribute as part of their commands, irrespectively of their other semantics. The following example illustrates a transformation script performing this function:

```
rule addDebuggerInstrumentation {
    match network
        action = ( {* (/BPMNAdapter/:/Token__.*/
/.*/):/position/ = value=/.*/; *} (*) )
        as scriptMatch;
    transform scriptMatch with
    function(scriptMatch) {
        for (var i=0, ii=scriptMatch.length; i<ii; i++) {
            var commands = scriptMatch[i].action.commands;
            commands.push(new Creation("exit",
"BPMNAdapter", "Exit");
            commands.push(new Invocation("exit",
"changeToken", [scriptMatch[i].value]));
            commands.push(new Deletion("exit"));
        }
    }
}
```

The above illustrated rule "addDebuggerinstrumentation" adds the following instruction sequence:

```
exit = new BPMNAdapter:Exit( );
exit:changeToken(...);
delete exit;
``` which creates an instance of the "Exit" type, invokes a method "changeToken", passing in the new token position, and finally removes the instance of "Exit". In order to only alter those scripts (by appending instructions to the "commands" property of the matched script) that contain an update statement on the "position" attribute of some script variable that is of type "Token_suffix" and to fetch the new value that is assigned to the token position, the "scriptMatch" rule is configured to (1) find all action scripts (denoted by the curly brackets { ... }) that (2) update an attribute "position" of some (arbitrarily named) script variable that (3) is statically bound to an instance of class "BPMNAdapter:Token_suffix". The nested terms of the script (i.e., the pre-condition that enables the script at runtime) is left open (wildcard "*") and so are the preceding and succeeding script commands that surround the sought-after statement (also represented by wildcard statements, *). The new token position value is remembered in the "value" property.

These transformation script 118 examples represent only a subset of the possibilities for which the silent migration controller 127 can be used. Any number of suitable alternatives can be used according to the update, modification, or other change to be performed. In some instances, the transformation script 118 may include a matching clause for a particular version of a process binary 151, such that modifying a particular process binary is dependent on that process binary meeting some version criteria. For example, if a change has been implemented in the current version of a process binary, and only needs to be made in older versions, a matching rule may be used to determine if a particular process binary is current or old, and only if it is determined to be old will the transformation function portion of the transformation script be executed.

The BPM runtime 124 includes the silent migration controller 127, process binary parser 142, and runtime repository 148. In alternative implementations, some of the elements illustrated within the BPM runtime 124 may be located external to the BPM runtime 124, as well as included within its inherent operations. The runtime repository 148 acts as a runtime location where one or more deployed process binaries 151 are executed. The deployed process binaries 151 can be runtime versions of one or more process binaries stored in memory 112.

The process binary parser 142 acts as a parser of one or more process binaries 151 deployed at runtime. The process binary parser 142 parses the process binaries 151 into some abstract syntax tree, comprising type declarations, adapter configurations, scripts, and operators (i.e., the entities upon which the matching clauses and transformation functions operate) and provides the parsed binary 151 to another component for further execution and manipulation. Normally, the process binary parser 142 can provide parsed process binaries 151 to the BPM runtime 124 that executes those process binaries 151. In the current instance, the process binary parser 142 can provide the parsed process binaries 151 to the silent migration controller 127 to allow for one or more modifications to be made. The kernel script parser 145 is a subcomponent of the process binary parser 142, and can be used to parse some portions of the process binaries 151. Specifically, the process binaries comprise event-condition-action rules where the "action" part is a script that follows some well-defined script syntax. Accordingly, there is a dedicated parser for these scripts that can be reused in the silent migration controller 127. In many instances, the deployed process binaries 151 will include type definitions, operator graphs, and adapter configurations. The operator graphs, for example, may include one or more scripts to be parsed. The kernel script parser 145 can be a dedicated component used to access and interact with these portions, although it may be capable of parsing other portions of the deployed process binaries 151 as well, where appropriate.

The parsed process binaries 151 are then passed to the silent migration controller 127, where the updates and modifications can be performed. The silent migration controller 127 is or can be one or more components that are used to process transformation scripts 139 defining one or more matching clauses and transformation functions to be applied to particular process binaries 151. The illustrated implementation of the silent migration controller 127 includes an XPath engine 130, a script interpreter 133, and a script runner 136. The transformation scripts 139 in the silent migration controller 127 may correspond to one or more transformation scripts 118 stored in memory 112, as well as the transformation scripts 175 illustrated in the software developer server memory 157. In some instances, the transformation scripts 139 may be passed or pushed to the silent migration controller 127 by external components or processes, while in other instances, the silent migration controller 127 may pull the transformation scripts 139 from one or more predefined locations. For example, some lifecycle management software which is responsible for rolling out software updates or upgrades (such as support packages) may push the transformation scripts into the silent migration controller 127. In some instances, the silent migration controller 127 may include one or more APIs that can be accessed by external components that define how transformation scripts 139 can be provided to the silent migration controller 127. In some instances, the transformation scripts 139 can be provided along with other lifecycle management operations, with the silent migration controller 127 performing one or more lifecycle management operations in addition to updating the process binaries 151. In other instances, the silent migration controller 127 may be limited to updating process binaries 151.

The script runner 136 receives the parsed process binaries 151 from the process binary parser 142, and interprets and acts upon the transformation scripts 139 that are provided to or accessed by the silent migration controller 127. The script runner 136 can read through and apply the matching clauses and transformation functions defined by the transformation scripts 139 for each of the scripts' corresponding process binaries 151. In some instances, the script runner 136 can identify the process binary 151 corresponding to a particular transformation script 139 or portion thereof, and access (or request a parsing of) the parsed (or unparsed) process binary 151. The script runner 136 can be associated with the illustrated XPath engine 130 and script interpreter 133 to execute or process the matching clauses and/or transformation functions included in a particular transformation script 139, where appropriate. In some instances, the script runner 136 may be able to perform the operations defined in the transformation script 139 itself without accessing additional components. In other instances, the script runner 136 may include one or more additional components that can be used to interpret and perform the operations defined by the transformation script 139. The script runner 136 can access the syntax definition for the scripting language of the transformation script 139 to determine the appropriate operations to be performed as defined. The XPath engine 130 can be used to apply matching rules to one or more hierarchical structures, including XML content (e.g., some of the adapter configurations of the process binaries 151). The script interpreter 133 may be an ECMAScript interpreter, as well as any other scripting language associated with the silent migration controller 127, as appropriate.

Once the modifications are made to a particular process binary 151, the silent migration controller 127 can send the modified process binary 151 back to the runtime repository 148 to be saved. In some instances, the updated process binary 151 may be passed back to the process binary parser 142, which can update the process binary 151 as performed by the silent migration controller 127. The process binary parser 142 may initially provide the silent migration controller 127 with a text file representing the parsed process binary. The silent migration controller 127 can make the appropriate changes to the text file, which is then passed back to the process binary parser 142. The process binary parser 142 can then generate the updated process binary 151 in its executable format, such as a trigger network format executable by the BPMS system.

The software developer server 157 represents one or more servers or other systems at which BPMS systems are designed, updated, and/or maintained. The software developer server 157 includes an interface 160 (similar to interface 106), a processor 163, a memory 166 (similar to or different from memory 112), and a BPMN to process binary compiler 178. The processor 163 may be similar to processer 109 of the application server 103. The processor 163 can be used to execute the BPMN to process binary compiler 178, which can be used to create compiled process binaries 172 from defined BPMN models 169. In some instances, the software developer server 157 may also include one or more components for generating BPMN models 169, as well as for defining and creating transformation scripts 175 to be distributed to and used by one or more application servers 103. The BPMN models 169 can define one or more business processes in BPMN notation, as well as interactions between different models and systems. The BPMN models 169 can be provided to the BPMN to process binary compiler 178 that is used to generate the objects and components included in the process binaries 172 at the software developer server 157. The process binaries 172 can then be provided to and/or deployed at one or more application servers 103. In some instances, only the developers may operate and interact with the BPMN models 169, while customers and users of the business process applications 121 may execute the compiled process binaries 172 created at the software developer server 157. The transformation scripts 175 may be created in response to bugs identified in a particular process binary 172, to changes requested by a customer, as well as other reasons for modifying the software. In some instances, the transformation scripts 175 may be generated in response to a customer request, while in others, the scripts 175 may be created during the normal lifecycle of software development. In some instances, the transformation scripts 175 may be created by entities other than the developers of the process binaries 151, allowing third parties to modify the process binaries 172/115/151 deployed by software users.

The illustrated environment 100 includes one or more clients 181. The clients 181 may be associated with a particular application server 103. Each client 181 may be any computing device operable to connect to or communicate with at least one of the application servers 103 using a wireline or wireless connection, via the network 154, or another suitable communication means or channel. In some instances, the client 181 may be a part of or associated with a business process involving one or more of the business process applications 121. In general, each client 181 includes a processor 187, an interface 184, a client application 193, a graphical user interface (GUI) 196, and a memory 190. In general, the client 181 comprises an electronic computer device operable to receive, transmit, process, and store any appropriate data associated with the environment 100 of FIG. 1. It will be understood that there may be any number of clients 181 associated with, or external to, environment 100. For example, while illustrated environment 100 includes a single client 181, alternative implementations of environment 100 may include multiple clients communicably coupled to the one or more of the systems illustrated. In some instances, one or more clients 181 may be associated with administrators of the environment, and may be capable of accessing and interacting with the settings and operations of the business process application 121, the BPM runtime 124, and/or other components of the application server 103. Additionally, there may also be one or more additional clients 181 external to the illustrated portion of environment 100 capable of interacting with the environment 100 via the network 154. Further, the terms "client" and "user" may be used interchangeably as appropriate without departing from the scope of this disclosure. Moreover, while each client 181 is described in terms of being used by a single user, this disclosure contemplates that many users may use one computer, or that one user may use multiple computers.

The GUI 196 associated with each client 181 may comprise a graphical user interface operable to, for example, allow the user of a client 181 to interface with at least a portion of the business process application 121 and its associated operations and functionality. Generally, the GUI 196 provides the particular user with an efficient and user-friendly presentation of business data provided by or communicated within the system. The GUI 196 may comprise a plurality of customizable frames or views having interactive fields, pull-down lists, and buttons operated by the user. For example, the GUI 196 may provide interactive elements that allow a user to interact with a particular business process application 121 or BPMN runtime 124, as well as other components within and/or external to environment 100. The different portions of the application server's functionality may be presented and accessible to the user through the GUI 196, such as through a client application 193 (e.g., a web browser). Generally, the GUI 196 may also provide general interactive elements that allow a user to access and utilize various services and functions of a particular business process application 121. In some instances, the client application 193 may be used to access various portions of different business application servers 103 or business applications 121. In some instances, the client application 193 may be used to access (and the GUI 196 used to view) information retrieved from the memory 112 (i.e., a transformation script 118) via the business process application 121 and/or BPM runtime 124. Alternatively, the client application 193 may be used to access and manipulate the operations of the silent migration controller 127. In some instances, the client application 193 may be an agent or client-side version of the business process application 121. The GUI 196 may present the information of the client application 193 for viewing and interaction. In general, the GUI 196 is often configurable, supports a combination of tables and graphs (bar, line, pie, status dials, etc.), and is able to build real-time portals, where tabs are delineated by key characteristics (e.g., site or micro-site). Therefore, the GUI 196 contemplates any suitable graphical user interface, such as a combination of a generic web browser, intelligent engine, and command line interface (CLI) that processes information in the platform and efficiently presents the results to the user visually.

As used in this disclosure, each client 181 is intended to encompass a personal computer, touch screen terminal, workstation, network computer, kiosk, wireless data port, smart phone, personal data assistant (PDA), one or more processors within these or other devices, or any other suitable processing device. For example, each client 181 may comprise a computer that includes an input device, such as a keypad, touch screen, mouse, or other device that can accept user information, and an output device that conveys information associated with the operation of one or more application servers 103 and their functionality and/or the client 181 itself, including digital data, visual information, or the GUI. Both the input and output device may include fixed or removable storage media such as a magnetic storage media, CD-ROM, or other suitable media, to both receive input from and provide output to users of client 181 through the display, namely, the GUI 196. The client's processor 187, interface 184, and memory 190 may be similar to or different from those described in connection with the other components illustrated in FIG. 1, although alternative implementations of one or more of these components may be used, as well as implementations where additional components may also be included.

Figure 2:
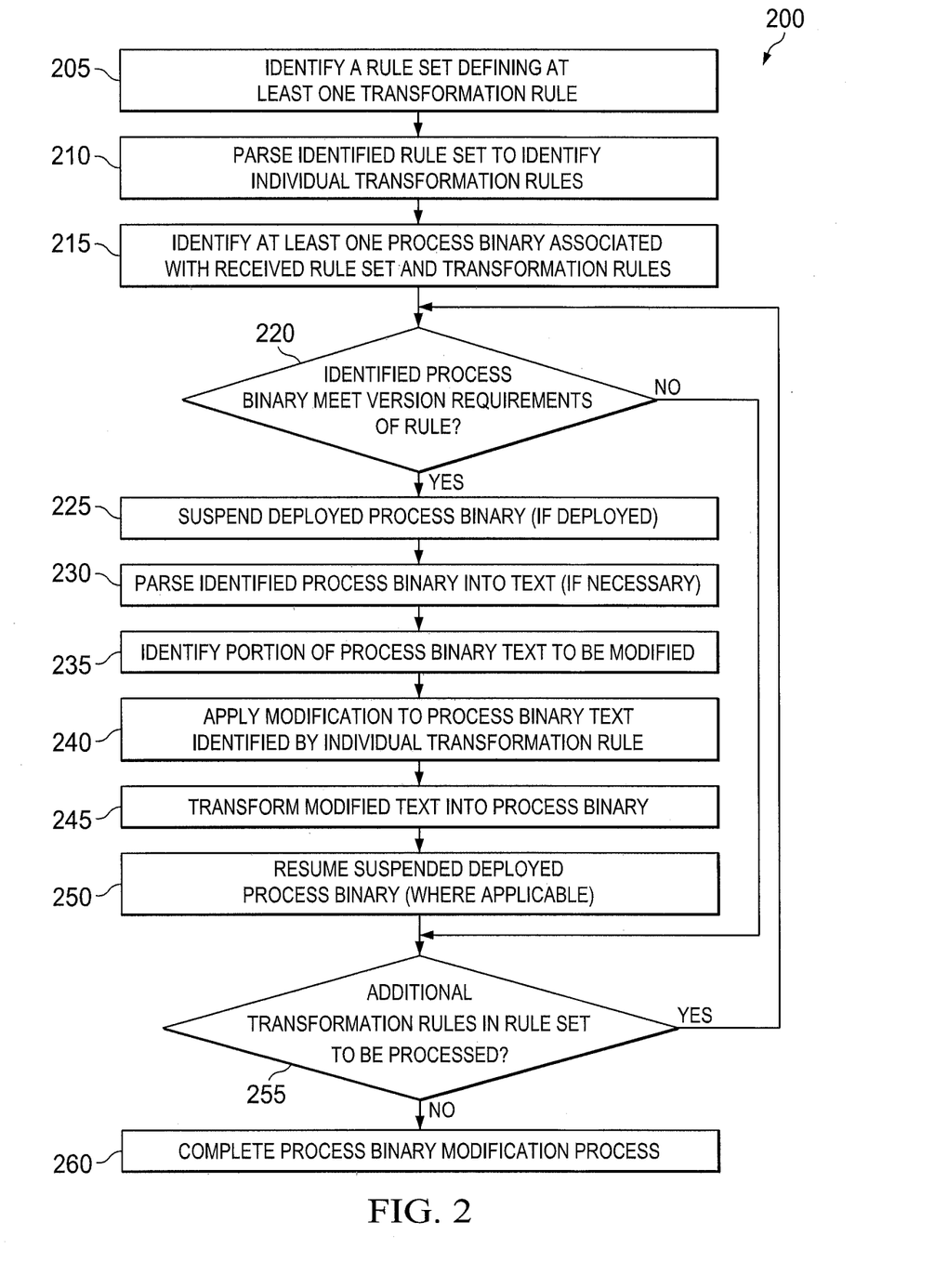
FIG. 2 is a flowchart of an example process for identifying and processing a transformation rule set for updating a deployed process binary.

FIG. 2 is a flowchart of an example process 200 for identifying and processing a rule set for updating a deployed process binary. For clarity of presentation, the description that follows generally describes method 200 in the context of environment 100 illustrated in FIG. 1. However, it will be understood that method 200 may be performed, for example, by any other suitable system, environment, or combination of systems and environments, as appropriate.

At 205, a rule set defining at least one process binary modification, or transformation rule is identified. Each transformation rule in the rule set can include at least one matching rule or clause to identify a portion or portions of the process binary to be modified, and at least one transformation function defining the actual modifications to be made to the process binary. The rule set may be similar to the transformation scripts (118/139/175) described in FIG. 1. Multiple process binary modifications can be included in a single transformation rule set, allowing a plurality of changes to be made to a single portion of the corresponding process binary or to multiple portions thereof. Identifying the rule set may include receiving the transformation script including the transformation rule set from a software developer or third party (e.g., via email, FTP, or push updates), accessing and/or retrieving the rule set from a defined rule set location (i.e., pulling from a rule set queue), or any other suitable method.

At 210, the identified rule set is parsed to identify individual transformation rules. Parsing the rule set may include identifying enumerated rules, determining the start and end point of a particular rule, or otherwise identifying individual rules from the rule set. In some instances, traditional scanning and parsing technologies may be used for parsing, such as bottom-up LR(1) parsers that are generated by parser generation tools. In some instances, parsing the transformation rule set may include identifying one or more scripting languages or formats associated with the individual transformation rules or rule set. At 215, at least one process binary associated with the transformation rule set and/or the individual transformation rules is identified. If none are identified, such as when there are not yet any process binaries deployed to the BPMS runtime, the transformation rules are not applied. In some instances, each transformation rule set may be associated with only a single process binary, while in others, multiple process binaries may be associated with the transformation rule set. At 220, a determination is made based on one or more version requirements included in a particular process binary modification rule from within the transformation rule set. Specifically, a comparison of the identified at least one process binary to a particular version requirement within the corresponding transformation rule set or individual transformation rule is performed. In some instances, the modifications may only be designated for use with particular versions of a process binary, such as where newer versions have been corrected or modified previously, and where only particular older versions require the changes. Other threshold comparisons may be made, including a determination as to whether the transformation rule has already been performed upon the identified process binary. If the comparison determines that the identified process binary does not meet the requirements or threshold of the current rule set or rule, method 200 continues at 255. In some instances, version requirements may be established for the entire rule set, although in other instances version requirements may be associated with a single rule, as well as a subset of defined rules. If, however, the identified process binary meets the requirements of the transformation rule or rule set, method 200 continues at 225.

At 225, a process binary can be suspended if it is deployed and/or executing. For example, if the identified process binary is currently operating, modifications to the process binary may interrupt its operations and cause errors to occur. In some instances, the process binary may only be suspended if currently executing. Particular instances of the affected process binary may be suspended for the duration of the transformation, thus facilitating updates without downtown which incorporate running business processes (apart from future process instances which are started at a later point in time.)

At 230, the identified process binary can be parsed into a text-based format or in-memory representation, such as an abstract syntax tree, where necessary. For instance, process binaries may be stored in an executable format, and may include one or more constructs interpreted by a runtime engine or environment to perform the corresponding business processes associated with the process binary. By parsing the process binary into a text-based version, such as a text file, XML file, or other suitable file type, the changes to the process binary can be applied using matching and transformation rules within a rule set.

At 235, a portion of the process binary text to be modified is identified. The identification can be performed using one or more matching rules that can parse the textual representation of the process binary for portions that match portions identified by the one or more matching rules. For example, a particular class name, type, or other identifying portion of the process binary can be specified by the matching rule. Once the portion is identified, the transformation functions of the transformation rule set (or particular transformation rule) can be processed to perform the modifications to the process binary text at 240. In some instances, the transformation rule set may be defined in a particular scripting language (or combination of languages), such that the rule set is provided in the appropriate scripting language so that the matching and transformation rules can be read, interpreted, and executed by an appropriate engine, program, or component. Examples of matching rules (or clauses) and transformation rules are described above with regard to FIG. 1.

At 245, the modified process binary text is transformed into the original, or executable, format of the process binary. In some instances, the same component that parsed the process binary into a text format can perform the reverse operations of transforming the process binary text into the executable process binary. In some instances, the new version of the executable process binary can overwrite or replace the original version of the process binary. In other instances, the new and old versions of the process binary may be retained, with the new version being used where appropriate and the old version being archived or retained for historical, testing, or other purposes. If the modified process binary was suspended at 225, then the suspended process instances that belong to the (modified) process binary can be resumed at 250.

At 255, a determination is made as to whether additional transformation rules are included in the rule set and are to be processed. If additional rules exist, method 200 returns to 220 where those rules are processed. In some instances, all rules of a transformation rule set are applied before affected process instances are resumed. A consistent modification of a process binary may require multiple transformation rules where performing a single transformation rule may produce a temporarily inconsistent intermediate state of the process binary. If no additional rules exist, method 200 continues to 260, where the process binary modification process is completed. In some instances, completing the process binary modification process may include notifying an administrator or other user that the relevant process binaries have been modified. Additionally, any errors or issues that occurred during the process can be presented to the appropriate entity, individual, or location.

Figure 3:
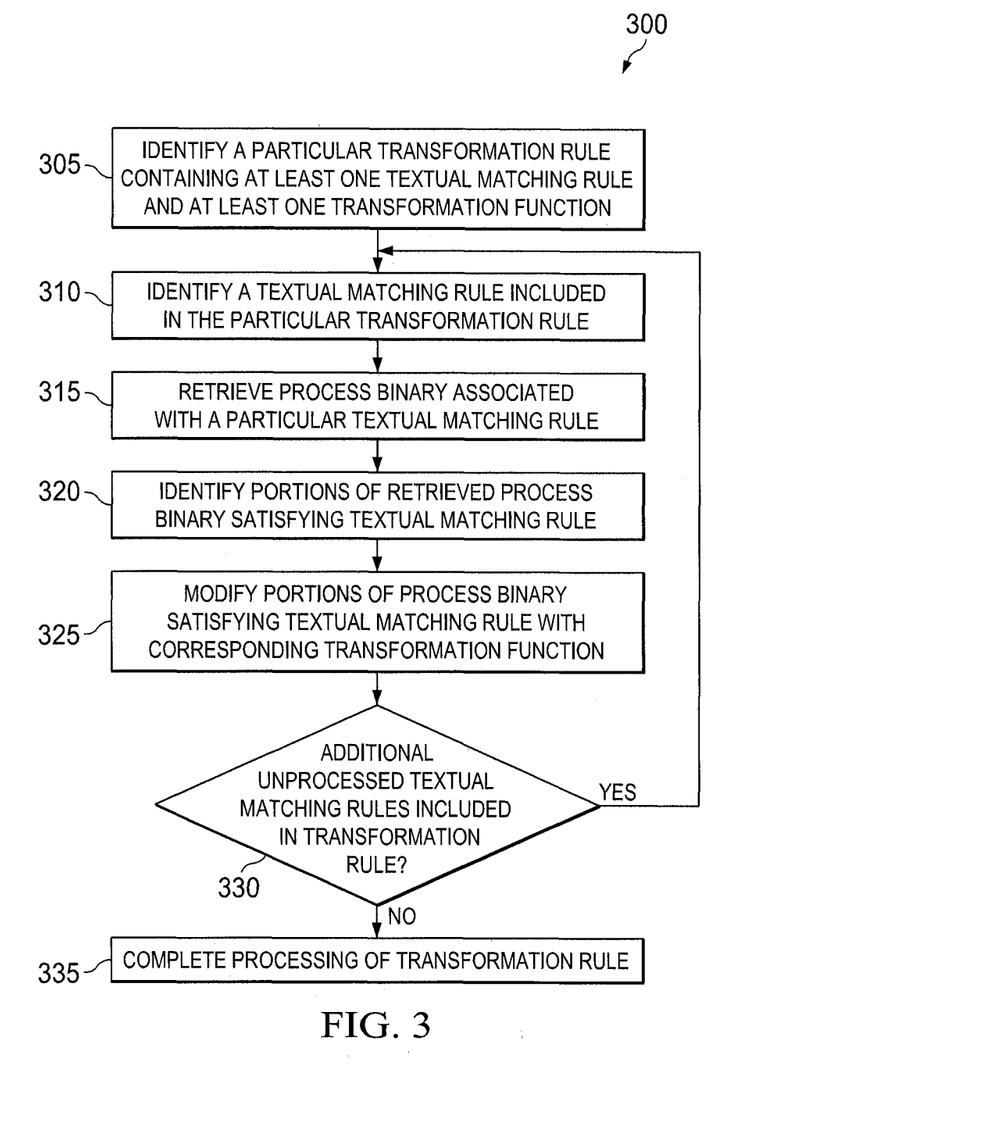
FIG. 3 is a flowchart of an example process for matching portions of a process binary to a matching rule included in a rule set and applying a corresponding transformation function to a portion of the process binary identified by the matching rule.

FIG. 3 is a flowchart of an example process 300 for matching portions of a business process binary to a matching rule included in a rule set and applying a corresponding transformation rule to a portion of the process binary identified by the matching rule. For clarity of presentation, the description that follows generally describes method 300 in the context of environment 100 illustrated in FIG. 1, as well as related to various operations of previously-described method 200. However, it will be understood that method 300 may be performed, for example, by any other suitable system, environment, or combination of systems and environments, as appropriate.

At 305, a particular transformation rule containing at least one textual matching rule and at least one transformation function is identified. Generally, the particular transformation rule will be located within a transformation rule set, transformation script, or other appropriate set of rules. In some instances, however, the particular transformation rule may be the only transformation rule to be executed during a particular lifecycle management migration, update, or other event.

At 310, a textual matching rule included in the particular transformation rule is identified. Generally, transformation rules can contain two portions: a textual matching rule and a transformation function. The textual matching rule is meant to locate particular portions or locations within a textual version of a particular process binary where a modification is meant to occur. The transformation functions define the exact modifications to be made, and use the portions and/or locations identified by the matching rule as the starting point for those modifications.

At 315, the process binary associated with a particular textual matching rule is retrieved from a runtime repository or another suitable location. In some instances, an entire transformation rule set may be associated with a single process binary, such that the single process binary can be retrieved prior to identifying the textual matching rule. In other instances, one or more of the textual matching rules in a transformation rule set may be directed to different process binaries. The textual matching rules may include one or more regular expressions written in syntax understood by the update or modification engine or components.

At 320, portions of the retrieved process binary (identified at 315) that satisfy the textual matching rule are identified. In some instances, multiple portions of a particular process binary (and possibly, multiple process binaries) may satisfy the textual matching rule. Those identified portions and/or their locations within the process binary text are passed or provided to the appropriate update engine, where the operations defined in the corresponding transformation function(s) are performed. Specifically, at 325, the portions of the process binary satisfying the textual matching rule are modified based on the corresponding transformation function. In some instances, the transformation function may include instructions to change and/or delete portions of instruction within the process binary text, or to add instructions to the process binary.

At 330, a determination is made as to whether additional unprocessed textual matching rule and transformation function combinations are included in the transformation rule. If additional transformation rule combinations exist, then method 300 returns to 310 where the next rule combination is processed. If, however, no additional transformation rule combinations remain unprocessed, method 300 continues to 335, where processing of the transformation rule is completed.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for migrating business process content, the method comprising:

identifying a rule set associated with at least one process binary, the at least one process binary comprising a compiled business process model for runtime execution, the rule set including at least one matching clause identifying a portion of the at least one process binary for modification, the rule set further including at least one transformation function corresponding to the at least one matching rule for modifying the identified portion of the at least one process binary;

identifying at least one deployed process binary associated with the identified rule set;

suspending execution of an instance of the at least one identified deployed process binary;

while suspending execution, modifying a portion of the at least one retrieved deployed process binary based on the identified rule set, where modifying the portion of the at least one retrieved deployed process binary includes:

identifying at least one portion of the at least one retrieved deployed process binary satisfying the at least one matching clause; and applying the at least one transformation function corresponding to the at least one satisfied matching clause to the at least one identified portion of the at least one retrieved deployed process binary to generate a modified version of the at least one retrieved deployed process binary; and resuming the suspended instance of the at least one identified deployed process binary after the modification is complete based on the prior execution state, the resumed instance using the modified version of the at least one retrieved deployed process binary for continued execution.

2. The method of claim 1, where the at least one matching clause includes an identification of at least one process binary version upon which the rule set is to be applied.

3. The method of claim 2, wherein identifying the at least one deployed process binary associated with the identified rule set includes:
   comparing the identification of the at least one process binary version upon which the rule set is to be applied with at least one deployed process binary;
   applying the at least one transformation function corresponding to the at least one matching clause to only the deployed process binaries matching the identification of the at least one process binary version.

4. The method of claim 1, wherein identifying the rule set includes receiving the rule set from a vendor of a business process modeling suite (BPMS) associated with the deployed process binary.

5. The method of claim 1, wherein the at least one deployed process binary is modified at a customer location.

6. The method of claim 5, wherein the rule set is included in a transformation script to be processed by a generic migration controller at the customer location.

7. The method of claim 1, further comprising:
   converting the at least one deployed process binary associated with the rule set into a text-based file prior to modifying the portion of the at least one retrieved deployed process binary;
   modifying a portion of the text-based file corresponding to the portion of the at least one retrieved deployed process binary to modify the portion of the at least one retrieved deployed process binary identified by the rule set; and
   converting the text-based file into a format of the at least one deployed process binary after completing the modifications to the portion of the text-based file.

8. A computer program product for migrating business process content, the computer program product comprising computer readable instructions embodied on tangible, non-transitory media, the instructions operable when executed to:
   identify a rule set associated with at least one process binary, the at least one process binary comprising a compiled business process model for runtime execution, the rule set including at least one matching clause identifying a portion of the at least one process binary for modification, the rule set further including at least one transformation function corresponding to the at least one matching rule for modifying the identified portion of the at least one process binary;
   identify at least one deployed process binary associated with the identified rule set;
   suspend execution of an instance of the at least one identified deployed process binary;
   while suspending execution, modify a portion of the at least one retrieved deployed process binary based on the identified rule set, where modifying the portion of the at least one retrieved deployed process binary includes:
      identifying at least one portion of the at least one retrieved deployed process binary satisfying the at least one matching clause; and
      applying the at least one transformation function corresponding to the at least one satisfied matching clause to the at least one identified portion of the at least one retrieved deployed process binary to generate a modified version of the at least one retrieved deployed process binary; and
   resume the suspended instance of the at least one identified deployed process binary after the modification is complete based on the prior execution state, the resumed instance using the modified version of the at least one retrieved deployed process binary for continued execution.

9. The product of claim 8, the instructions further operable when executed to:
   converting the at least one deployed process binary associated with the rule set into a text-based file prior to modifying the portion of the at least one retrieved deployed process binary;
   modifying a portion of the text-based file corresponding to the portion of the at least one retrieved deployed process binary to modify the portion of the at least one retrieved deployed process binary identified by the rule set; and
   converting the text-based file into a format of the at least one deployed process binary after completing the modifications to the portion of the text-based file.

10. A system comprising:
    one or more computers; and
    a computer-readable medium coupled to the one or more computers having instructions stored thereon which, when executed by the one or more computers, cause the one or more computers to perform operations comprising:
       identifying a rule set associated with at least one process binary, the at least one process binary comprising a compiled business process model for runtime execution, the rule set including at least one matching clause identifying a portion of the at least one process binary for modification, the rule set further including at least one transformation function corresponding to the at least one matching rule for modifying the identified portion of the at least one process binary;
       identifying at least one deployed process binary associated with the identified rule set;
       suspending execution of an instance of the at least one identified deployed process binary;
       while suspending execution, modifying a portion of the at least one retrieved deployed process binary based on the identified rule set, where modifying the portion of the at least one retrieved deployed process binary includes:
          identifying at least one portion of the at least one retrieved deployed process binary satisfying the at least one matching clause; and
          applying the at least one transformation function corresponding to the at least one satisfied matching clause to the at least one identified portion of the at least one retrieved deployed process binary to generate a modified version of the at least one retrieved deployed process binary; and
       resuming the suspended instance of the at least one identified deployed process binary after the modification is complete based on the prior execution state, the resumed instance using the modified version of the at least one retrieved deployed process binary for continue execution.

* * * * *